(12) United States Patent
Kurashima et al.

(10) Patent No.: US 7,724,731 B2
(45) Date of Patent: May 25, 2010

(54) TRANSMISSION NETWORK SYSTEM

(75) Inventors: Kenji Kurashima, Kawasaki (JP);
Toshihiro Togo, Kawasaki (JP);
Zhenhua Wang, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 919 days.

(21) Appl. No.: 11/085,557

(22) Filed: Mar. 22, 2005

(65) Prior Publication Data
US 2005/0180420 A1    Aug. 18, 2005

Related U.S. Application Data

(63) Continuation of application No. PCT/JP03/04897, filed on Apr. 17, 2003.

(51) Int. Cl.
*H04Q 11/00* (2006.01)
(52) U.S. Cl. .......................... 370/373; 370/403; 398/79
(58) Field of Classification Search ................. 370/373, 370/429, 540, 377, 384, 386, 389, 401–403, 370/405, 465–467, 532, 537, 538, 220, 225, 370/535; 398/50, 43, 56, 76, 79, 89, 98, 398/99
See application file for complete search history.

(56) References Cited

U.S. PATENT DOCUMENTS

| 5,491,696 | A | * | 2/1996 | Nishimura | 370/225 |
|---|---|---|---|---|---|
| 5,696,761 | A | * | 12/1997 | Kos et al. | 370/386 |
| 5,815,490 | A | * | 9/1998 | Lu | 370/223 |
| 5,942,989 | A | | 8/1999 | Nagasawa et al. | 340/826 |
| 6,122,249 | A | * | 9/2000 | Mochizuki et al. | 370/220 |
| 6,556,593 | B1 | * | 4/2003 | Herkersdorf et al. | 370/532 |
| 6,570,685 | B1 | * | 5/2003 | Fujita et al. | 398/79 |
| 6,836,486 | B2 | * | 12/2004 | Carson et al. | 370/542 |
| 2001/0033570 | A1 | * | 10/2001 | Makam et al. | 370/373 |
| 2003/0002498 | A1 | * | 1/2003 | Boulais et al. | 370/389 |
| 2003/0112832 | A1 | * | 6/2003 | Tsukamoto | 370/535 |
| 2004/0105456 | A1 | * | 6/2004 | Lanzone et al. | 370/429 |
| 2004/0131090 | A1 | * | 7/2004 | Clauberg | 370/540 |
| 2006/0285551 | A1 | * | 12/2006 | Barker et al. | 370/465 |

FOREIGN PATENT DOCUMENTS

| JP | 3-132125 | 6/1991 |
|---|---|---|
| JP | 9-135243 | 5/1997 |
| JP | 10-303899 | 11/1998 |
| JP | 11-220499 | 8/1999 |
| JP | 2000-252941 | 9/2000 |
| JP | 2000-341309 | 12/2000 |
| JP | 2001-144714 | 5/2001 |

* cited by examiner

*Primary Examiner*—Kwang B Yao
*Assistant Examiner*—Jeffrey M Rutkowski
(74) *Attorney, Agent, or Firm*—Staas & Halsey LLP

(57) ABSTRACT

In a transmission network system in which a path is set between a transmission node and a receiving node and which transmits a transmission signal between the nodes, crossconnect settings of the nodes are enabled while personal settings are minimized.

A transmission node has a first path-setting-receiving section; transmission-path-setting change sections; and change insertion sections which report information about a change in path setting received by said path-setting-receiving section by inserting the information into a transmission signal to be transmitted from the node to a receiving node. The receiving node has a second path-setting-receiving section and receiving-path-setting change sections for changing path settings of the node on the basis of the information about a change in path setting.

12 Claims, 12 Drawing Sheets

FIG. 4

| BIT No. | | INFORMATION |
|---|---|---|
| 1 | | CROSSCONNECT SETTING CHANGED/UNCHANGED |
| 2 | | DIRECTION OF CROSSCONNECT (ONE-WAY/TWO-WAYS SETTING) |
| 3 | STARTING POINT SIDE | NODE NO. (#1 TO 16) |
| 4 | | |
| 5 | | |
| 6 | | |
| 7 | | VC-4 CHANNEL NO. (#1 TO 16: LOW-ORDER GROUP) |
| 8 | | |
| 9 | | |
| 10 | | |
| 11 | | VC-12 CHANNEL NO. (#1 TO 63: LOW-ORDER GROUP) (IN CASE OF 0, THERE IS NO PATH DEFINITION OF VC-12 LEVEL) |
| 12 | | |
| 13 | | |
| 14 | | |
| 15 | | |
| 16 | | |
| 17 | | VC-4 CHANNEL NO. (#1 TO 16: HIGH-ORDER GROUP) |
| 18 | | |
| 19 | | |
| 20 | | |
| 21 | | VC-12 CHANNEL NO. (#1 TO 63: HIGH-ORDER GROUP) (IN CASE OF 0, THERE IS NO PATH DEFINITION OF VC-12 LEVEL) |
| 22 | | |
| 23 | | |
| 24 | | |
| 25 | | |
| 26 | | |
| 27 | | SPECIFY EAST/WEST SIDE OF HIGH-ORDER GROUP |
| 28 | END POINT SIDE | NODE NO. (#1 TO 16) |
| 29 | | |
| 30 | | |
| 31 | | |
| 32 | | VC-4 CHANNEL NO. (#1 TO 16: LOW-ORDER GROUP) |
| 33 | | |
| 34 | | |
| 35 | | |
| 36 | | VC-12 CHANNEL NO. (#1 TO 63: LOW-ORDER GROUP) (IN CASE OF 0, THERE IS NO PATH DEFINITION OF VC-12 LEVEL) |
| 37 | | |
| 38 | | |
| 39 | | |
| 40 | | |
| 41 | | |
| 42 | | VC-4 CHANNEL NO. (#1 TO 16: HIGH-ORDER GROUP) |
| 43 | | |
| 44 | | |
| 45 | | |
| 46 | | VC-12 CHANNEL NO. (#1 TO 63: HIGH-ORDER GROUP) (IN CASE OF 0, THERE IS NO PATH DEFINITION OF VC-12 LEVEL) |
| 47 | | |
| 48 | | |
| 49 | | |
| 50 | | |
| 51 | | |

FIG. 5

| | PATTERN | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| STARTING POINT | | — | — | — | — | — | — | — | — | — | — | — | — | — | — | — | — | — | — |
| | LOW-ORDER GROUP | O | O | O | O | O | O | O | O | O | UNOCC- UPIED | UNOCC- UPIED | UNOCC- UPIED | UNOCC- UPIED | UNOCC- UPIED | UNOCC- UPIED | UNOCC- UPIED | UNOCC- UPIED | UNOCC- UPIED |
| | HIGH-ORDER GROUP (END POINT SIDE) | O | IDEN- TICAL | UNOCC- UPIED | O | IDEN- TICAL | UNOCC- UPIED | O | IDEN- TICAL | UNOCC- UPIED | O | IDEN- TICAL | UNOCC- UPIED | O | IDEN- TICAL | UNOCC- UPIED | O | IDEN- TICAL | UNOCC- UPIED |
| PASSAGE | HIGH-ORDER GROUP (STARTING POINT SIDE) | → | → | → | → | → | → | → | → | → | → | → | → | → | → | → | → | → | → |
| | HIGH-ORDER GROUP (END POINT SIDE) | → | → | → | → | → | → | → | → | → | → | → | → | → | → | → | → | → | → |
| END POINT | HIGH-ORDER GROUP (STARTING POINT SIDE) | → | → | → | → | → | → | → | → | → | → | → | → | → | → | → | → | → | → |
| | LOW-ORDER GROUP | O | O | O | IDEN- TICAL | IDEN- TICAL | IDEN- TICAL | UNOCC- UPIED | UNOCC- UPIED | UNOCC- UPIED | O | O | O | IDEN- TICAL | IDEN- TICAL | IDEN- TICAL | UNOCC- UPIED | UNOCC- UPIED | UNOCC- UPIED |

TRANSMISSION NETWORK SYSTEM

This application is a continuation application, filed under 35 USC 111(a), of International Application PCT/JP2003/004897, filed Apr. 17, 2003.

FIELD OF THE INVENTION

The present invention relates to a transmission network system, and more particularly, to a transmission network system suitable for use with a synchronous network, such as an SDH (Synchronous Digital Hierarchy) or a SONET (Synchronous Optical Network).

DESCRIPTION OF THE RELATED ART

In an SDH/SONET transmission network, a path between nodes has hitherto been established by means of manually setting a crossconnect between individual transmission devices (nodes) constituting the network. Specifically, settings are made to link an AID (Access Identifier) serving as address information about a channel unit of a signal received by each node to AID information about a channel unit to which a signal is to be sent, through an operator's input operation performed by way of a personal computer or the like.

For instance, an interface of low-order group information, such as first-order information, and an interface of high-order group information, such as an STM frame, are linked together by means of an operator's input operation, thereby enabling transmission of the low-order group information by way of a path used for transmitting the high-order group information.

Specifically, even when there is set one path which extends from a starting point node to an end point node by way of a transit node, AID information or the like which represents each connection interface is input at the respective nodes, thereby setting crossconnects one by one.

In such a conventional transmission network system, when a necessity arises for switching settings of a crossconnect, such as when an attempt is made to avoid a problem having arisen in a set path or when a network provider has received a request for changing a path setting from the user, the operator must perform input operation, on an as-needed basis. Therefore, the operation becomes intricate, thereby raising a problem of a failure to eliminate erroneous setting. Alternatively, considerable time must be consumed by personal individual setting operations.

The present invention has been conceived in light of the problems and provides a transmission network system which prevents erroneous setting due to an error in personal setting by making it possible to set a crossconnect in each node while minimizing personal settings and which can significantly curtail labor costs by shortening a personal setting time by leaps and bounds.

Prior-art techniques relevant to the present invention are as follows:
Patent Document 1
    Japanese Patent Laid-Open 2000-252941A
Patent Document 2
    Japanese Patent No. 3169541
Patent Document 3
    Japanese Patent Laid-Open HEI10-303899A

SUMMARY OF THE INVENTION

In order to achieve the object, a transmission network system of the present invention is directed toward a transmission network comprising a transmission node and a receiving node wherein a path is set between the nodes and a transmission signal is transmitted between the nodes, wherein the transmission node has a first path-setting-receiving section for receiving a change in a path setting when the path setting to be applied to the transmission signal is changed; a transmission-path-setting change section for changing a path setting of the transmission node on the basis of the change in path setting received by the first path-setting-receiving section; and a change insertion section for reporting information about the change in path setting received by the path-setting-receiving section by inserting the information into a transmission signal to be transmitted from the transmission node to the receiving node; and wherein the receiving node has a second path-setting-receiving section for receiving information about the change in path setting inserted into the transmission signal; and a receiving-path-setting change section for changing a path setting of a node on the basis of information about the change in path setting.

The path between the transmission node and the receiving node is set by way of a transit node, and the transit node on the path comprise a section which receives information about the change in path setting inserted in the transmission signal; a transit-node-path-setting change section which changes a path setting of a node on the basis of information about the change in path setting; and a transit transmission section which passes a transmission signal into which the change in path setting is inserted to the receiving node on the path, on the basis of the path setting changed by the transit-node-path-setting change section.

Moreover, there may also be configured such that the first path-setting-receiving section of the transmission node receives, as the change in path setting, address information about an input port of the transmission node into which a low-order group signal lower in order than the transmission signal is to be input; and such that the transmission-path-setting change section changes settings of an input port of the transmission node in accordance with the address information received by the first path-setting-receiving section.

The first path-setting-receiving section of the transmission node may be configured to receive, as the change in path setting, information indicating that an input port of the transmission node into which a low-order group signal lower in order than the transmission signal is to be input is changed to another, unoccupied input port; and the transmission-path-setting change section may be configured to retrieve another, unoccupied input port in accordance with the address information received by the first path-setting-receiving section and change settings such that the input port of the transmission node is changed to the retrieved, unoccupied input port.

In addition, the first path-setting-receiving section of the transmission node may be configured to receive, as the change in path setting, address information about an output port of the transmission node to which a high-order group signal corresponding to the transmission signal is to be output; and the transmission-path-setting change section may be configured to change settings of the output port of the transmission node, in accordance with the address information received by the first path-setting-receiving section.

Moreover, the first path-setting-receiving section of the transmission node may be configured to receive, as the change in path setting, address information indicating that an output port of the transmission node is given address information agreeing with the address information about the input port into which a low-order group signal lower in order than the transmission signal is to be input; and the path-setting change section may be configured to change settings of the output port of the transmission node in accordance with the information received by the first path-setting-receiving section.

The first path-setting-receiving section of the transmission node may also be configured to receive, as the change in path setting, information indicating that an input port of the transmission node into which a high-order group signal higher in order than the transmission signal is to be input is changed to another, unoccupied input port; and the transmission-path-setting change section may also be configured to retrieve another, unoccupied input port in accordance with the address information received by the first path-setting-receiving section and change settings such that the input port of the transmission node is changed to the retrieved, unoccupied input port.

The second path-setting-receiving section of the receiving node may also be configured to receive, as the change in path setting, address information about an output port of the receiving node to which a low-order group signal lower in order than the transmission signal is to be output; and the receiving-path-setting change section may also be configured to change settings of the output port of the receiving node, in accordance with the address information received by the second path-setting-receiving section.

The second path-setting-receiving section of the receiving node may also be configured to receive, as the change in path setting, information indicating that an output port of the receiving port to which a low-order group signal lower in order than the transmission signal is to be output is given address information agreeing with the address information about the input port of the receiving node to which a high-order group signal corresponding to the transmission signal is to be input; and the receiving-path-setting change section may also be configured to change settings of the output port of the receiving node, in accordance with the information received by the second The path-setting-receiving section.

The second path-setting-receiving section of the receiving node may also be configured to receive, as the change in path setting, information indicating that an output port of the receiving node into which a low-order group signal lower in order than the transmission signal is to be input is changed to another, unoccupied input port; and the receiving-path-setting change section may also be configured to retrieve another, unoccupied output port in accordance with the address information received by the second path-setting-receiving section and changes settings such that the output port of the receiving node is changed to the retrieved, unoccupied input port.

Therefore, according to the transmission network system of the present invention, the insertion section can report information about a change in a path setting received by the path setting receiving section by means of inserting the information into a transmission signal to be transmitted from the transmission node to the receiving node. Hence, setting of a crossconnect including a transit node can be processed automatically. Setting of the crossconnect between nodes can be effected while personal setting is minimized, thereby yielding an advantage of preventing erroneous setting, which would otherwise be caused by an error in personal setting. In addition, there is negated a necessity for setting a cross connect for the transmission node, the transit node, and the receiving node, respectively. A time required by personal setting is shortened by leaps and bounds, which in turn yields an advantage of significant curtailing labor cost.

BRIEF DESCRIPTION OF THE DRAWINGS

FIG. 4 is a view showing an example arrangement of bits in PAC (Path Access Control) information;

FIG. 5 is a view for describing a crossconnect setting pattern;

DESCRIPTION OF THE PREFERRED EMBODIMENTS

An embodiment of the present invention will be described hereinbelow by reference to the drawings.

(a) Description of an embodiment of the present invention

Figure 1:
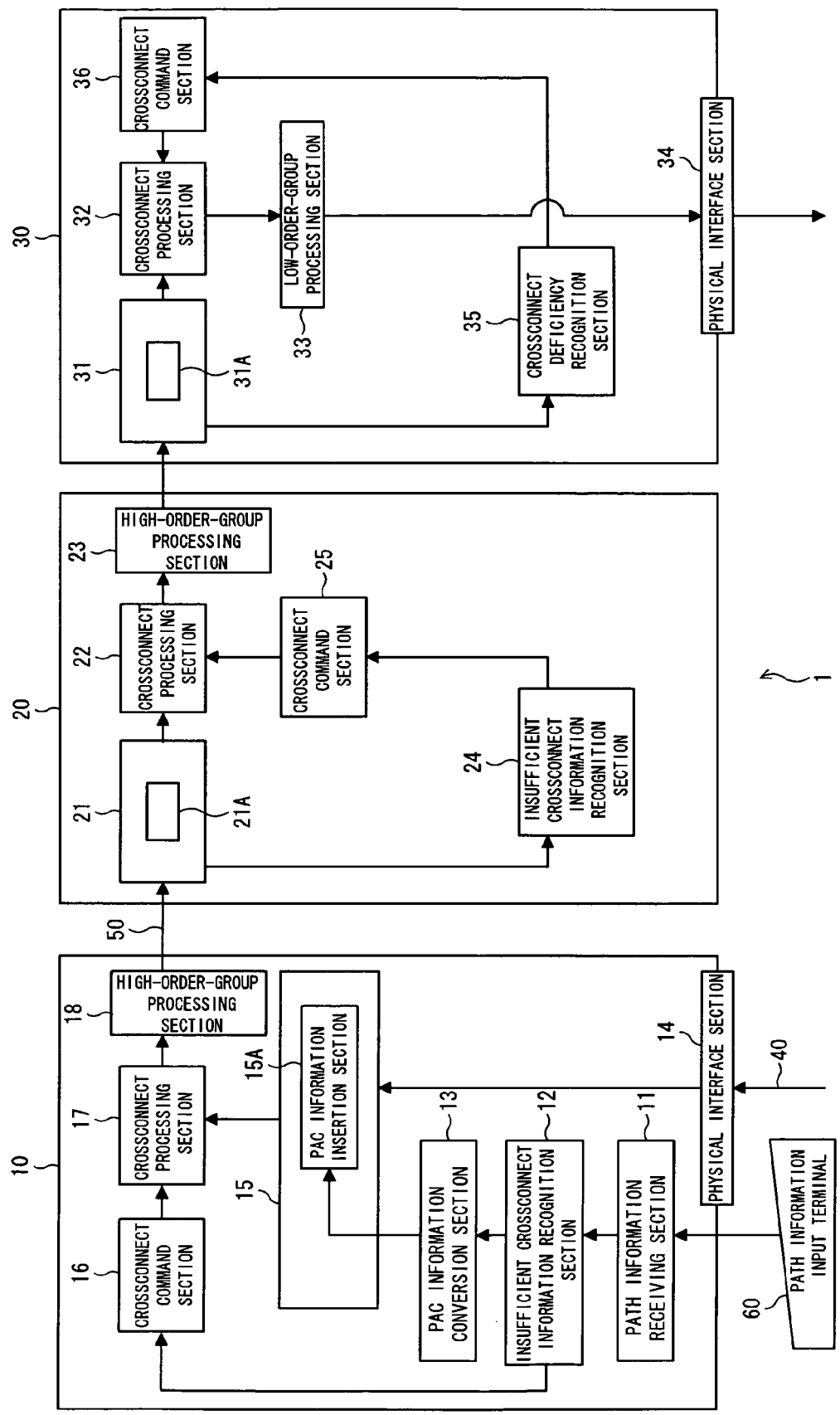
FIG. 1 is a block diagram showing an embodiment of the present invention.

FIG. 1 is a block diagram showing an embodiment of the present invention. In FIG. 1, reference numeral 1 designates a transmission network system of the embodiment. In this transmission network system 1, a path [e.g., a VC-12 (Virtual Container 12) path] is set so as to pass through three nodes [also called NEs (Network Elements)] 10, 20, and 30 constituting, e.g., a ring network serving as an SDH/SONET network. A transmission signal can be transmitted between the nodes 10 and 30.

In this transmission network system 1, when setting of the path between the nodes 10 and 30 is changed, information used for changing the path setting is inserted into header information about the transmission signal to be transmitted from the node 10 to the node 30 by way of the node 20, whereby the path setting can be autonomously changed in each of the nodes 10, 20, and 30. Therefore, the nodes 10, 20, and 30 of the present embodiment have a characteristic configuration pertaining to the present invention such as that shown in FIG. 1.

Specifically, the node 10 serving as a transmission (starting point) node comprises a path information receiving section 11, a insufficient crossconnect information recognition section 12, a PAC information conversion section 13, a physical interface section 14, a low-order group processing section 15, a crossconnect processing section 17, a high-order group processing section 18, and a crossconnect command section 16.

Here, the physical interface section 14 physically interfaces between a line 40 [e.g., a line (E1 line) having a speed of about 2 Mbps or thereabouts] under command of the node 10 and an SDH/SONET transmission path 50. The low-order group processing section 15 subjects to low-order group signal processing a signal output from the line 41 under command of the node 10.

Figure 2:
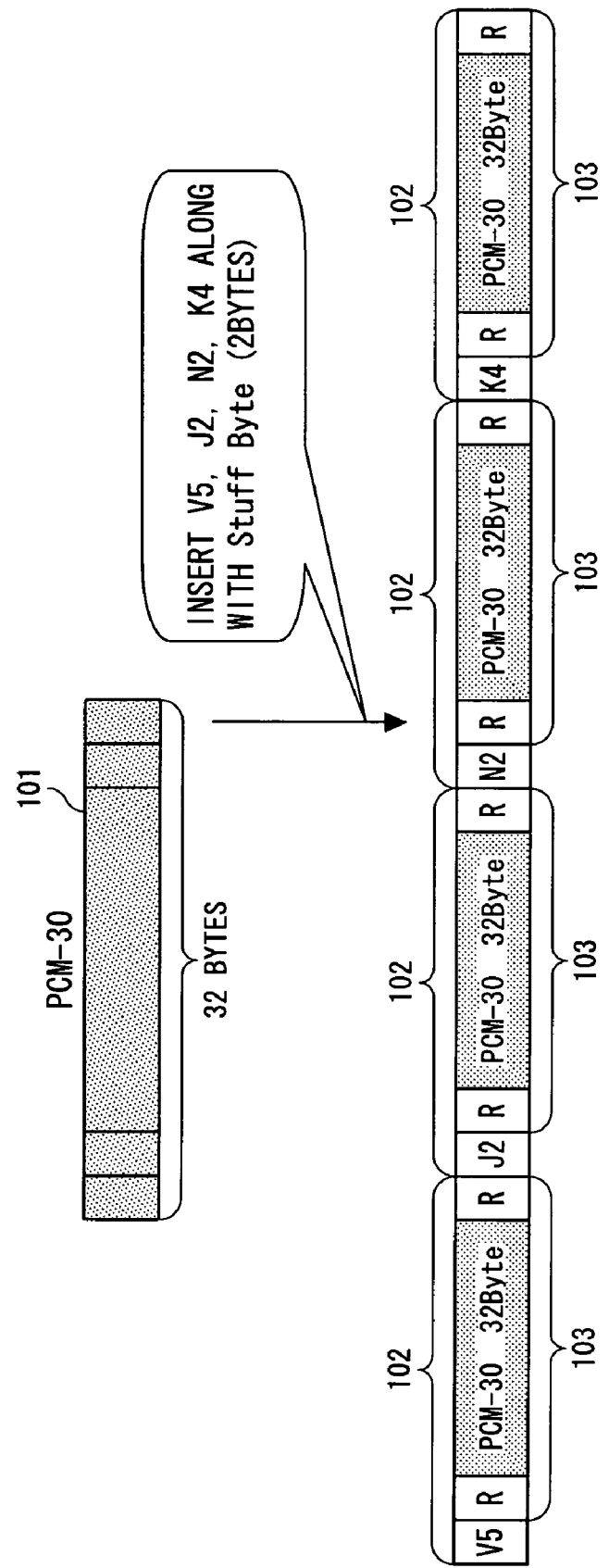
FIGS. 2 and 3 are views for describing operation of a low-order group processing section of a transmission node in the embodiment.

More specifically, when the line 41 has a speed of 2 Mbps or thereabouts (i.e., the E1 line), a PCM-30 signal 101; e.g., a signal shown in FIG. 2, is input to the low-order group processing section 15 from the line 41. A two-byte stuff byte is inserted into the signal 101, thereby forming a container (C-12) 103.

Moreover, V5, J2, N2, and K4 bytes are inserted, as POHs, into start positions of respective frames forming four containers 103 which are formed in the manner mentioned above and are continuous with each other in time sequence, whereby virtual container (VC-12) signals 102, each having a cycle of about 500 μs and being of 35 bytes, are formed.

In the low-order group processing section 15, the line 41 can also be taken as a line for a signal of C-4 level. In this case, a POH for a VC-4 signal is inserted into the input signal of C-4 level, thereby forming a virtual container (VC-4) signal [see reference numeral 104 shown in FIG. 3]. As will be described later, PAC (Path Access Control) information characterizing the present invention can be placed in a predetermined bit position of the POH, which forms the VC-12 signal or the VC-4 signal, for changing setting of crossconnect.

Specifically, the low-order group processing section 15 has a PAC information insert section 15A. The PAC information insert section 15A inserts PAC information, which has been converted into bit information by a PAC information conversion section 13 to be described later, into a predetermined bit position of the POH (e.g., the eighth bit of the K4 byte in the POH of the VC-12 or the eighth bit of the G1 byte in the POH of the VC-4) which is formed by the physical interface section 14 and constitutes a virtual container.

On the basis of settings of the crossconnect commanded by a crossconnect command section 16 to be described later (the crossconnect will be hereinafter sometimes called a "crocon"), the crossconnect processing section 17 subjects the signal output from the low-order group processing section 15 to crossconnect processing. Namely, when a command for changing crossconnect setting is issued by the crossconnect command section 16, the crossconnect processing section performs crossconnect processing in accordance with the change.

Specifically, a path—along which the virtual container signal formed by the low-order group processing section 15 is output to the SDH/SONET transmission path 50—is switched on the basis of details of the crossconnect setting effected through use of the AID (Access Identifier). Moreover specifically, an input port (a low-order group input port) of the low-order group processing section 15 and an output port of the high-order group processing section 18 are associated with each other in advance by means of the AID that defines the positions of the respective input ports. By virtue of this, the path is switched such that the virtual container signal output from the low-order group processing section 15 is output to a predetermined output path.

Further, the high-order group processing section 18 multiplexes the virtual container signal that has been subjected to crossconnect processing by a crossconnect processing section 17, and inserts into the virtual container signal overhead information [SOH (Section Overhead) or the like] which constitutes an STM signal, thereby forming an SDH/SONET frame. This SDH/SONET frame is transmitted to the node 30 by way of the node 20.

Figure 3:
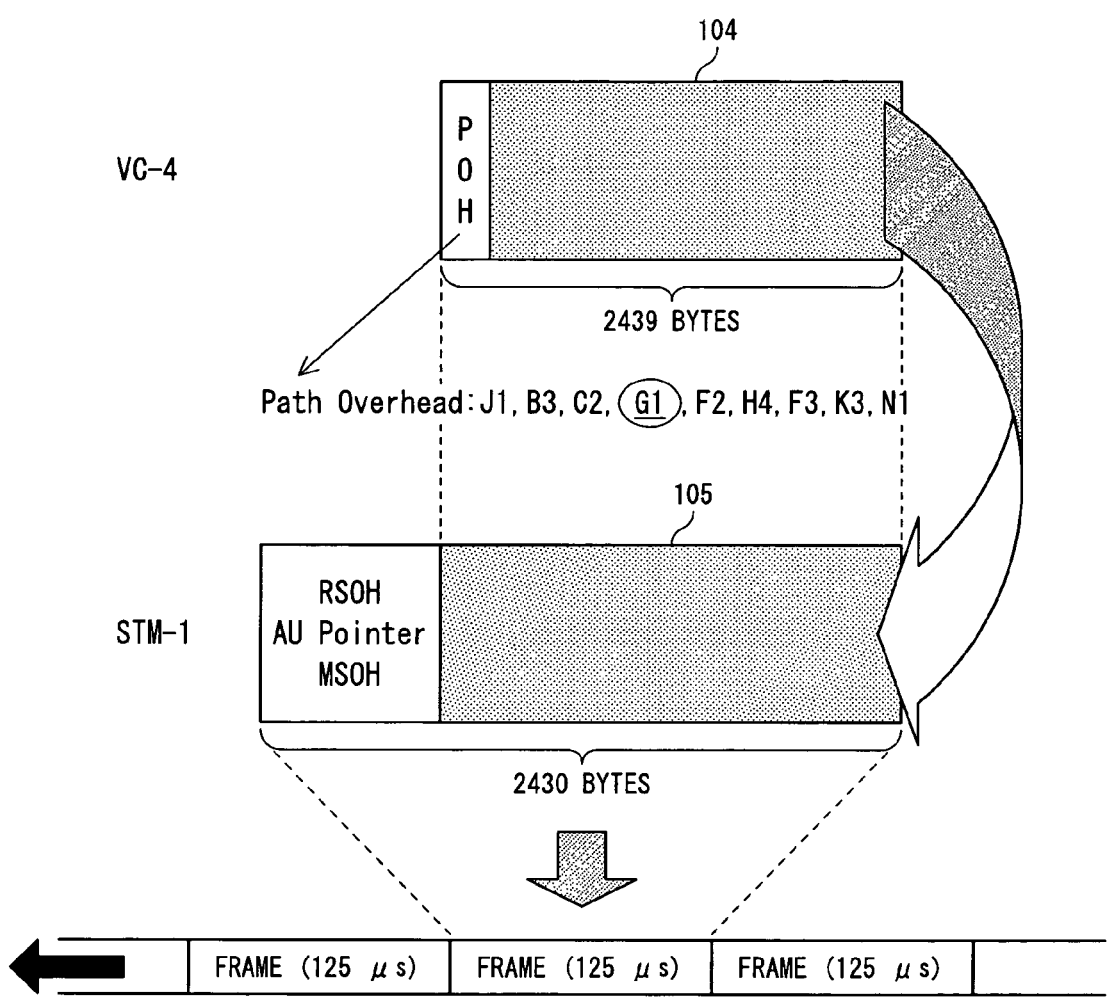

More specifically, the high-order group processing section 18 inserts, into the virtual container (e.g., VC-4) that has been subjected to crossconnect processing by the crossconnect processing section 17, overhead information [RSOH (Regenerator Section Overhead), an AU (Administrative Unit) pointer, and an MSOH (Multiplex SOH)], to thus form the SDH/SONET frame [e.g., an STM-1 frame 105 shown in FIG. 3].

When an attempt is made to change the path setting, the path information receiving section 11 reads path information input by way of a path information input terminal 60 formed from a personal computer or the like. Specifically, when the path settings applied to the transmission signal are changed, the path information receiving section 11 functions as a first path setting receiving section which receives a change in path setting.

The insufficient crossconnect information recognition section 12 recognizes a insufficiency—which is a crossconnect setting item for the node 10 and has not yet been input as a change—from the PAC information (a change in path setting) received by the path information receiving section 11, and can automatically determine the deficient crossconnect setting item. The PAC information conversion section 13 converts the change in path setting including the insufficiency recognized by the insufficient crossconnect information recognition section 12 into bit information used for inserting the change into the POH constituting the virtual container 102.

In relation to the information converted by the PAC information conversion section 13, information about the starting point node 10 and the end point node 30 of the path to be constructed; that is, a node number, an interface number (an AID or a channel number), and a transmission direction of a signal (a one-way direction or a two-way direction), is converted into bit information.

FIG. 4 is a view showing an example arrangement of bits in the above-described PAC information. As shown in FIG. 4, information is arranged in accordance with bit positions. The crossconnect command section 16 of the node 10 can issue to the crossconnect processing section 17 a command for changing crossconnect, through use of PAC information such as that shown in FIG. 4. As a result of the PAC information being transmitted to the nodes 20 and 30, the nodes 20 and 30 can also change crossconnect settings.

Information about whether the crossconnect settings have been changed or not is placed in the leading bit of the PAC information shown in FIG. 4. Information about a crossconnect direction (one-way or two-way, bit information showing a one-way direction in the case shown in FIG. 1) is placed in the second bit from top. Information about crossconnect of a starting point node (the transmission node 10) is placed in the third to twenty-seventh bits from the top. Information about crossconnect about an end point node (the receiving node 30) is placed in the twenty-eighth bit to the fifty-first bit from the top.

In the PAC information shown in FIG. 4, the third to sixth bits correspond to information for designating a node number of the starting point node 10, and the twenty-eighth to thirty-first bits correspond to information for designating a node number of the end point node 30. A node within the SDH/SONET ring network, which uses a transmission channel 50, can be arbitrarily specified by using four bits as information for specifying the node number.

When a ring network is constituted as the SDH/SONET network, a maximum number of 16 nodes can be present within one ring. Therefore, as shown in FIG. 4, the ring can be specified through use of 4-bit information.

The seventh bit to the tenth bit represent the channel number of the VC-4 serving as the low-order group AID at the starting point node 10. The eleventh bit to the sixteenth bit represent the channel number of VC-12 serving as the low-order group AID at the starting point node 10. Specifically, the AID of the virtual container number which is output from the low-order group processing section 15 and serves as an object of crossconnect is set at the levels of VC-4 and VC-12.

Signals of 63 E1 lines are equal in volume to the STM-1. Further, E1 signals are temporarily mapped in the VC-12 level. When the E1 signal is transmitted by the STM-1, an identifier used for representing an E1 signal in the STM-1 is required. For this reason, a channel number assigned to each of the E1 signals contained in the STM-1 is represented by use of six bits.

Moreover, the seventeenth to twentieth bits represent the channel number of the VC-4 signal serving as a high-order group AID in the starting point node 10, and the twenty-first to twenty-sixth bits represent the channel number of the VC-12 signal serving as the high-order group AID in the starting point node 10. Specifically, the AID linked as a destination path to which a virtual container signal is output from the low-order group processing section 15 can be specified as a change in crossconnect setting in the level of VC-4 or VC-12.

Therefore, even when the VC-4 signal into which the VC-12 signal is multiplexed is subjected to crossconnect, the link between the low-order group AID and the high-order group AID of the VC-12 signals constituting the VC-4 signal; that is, crossconnect setting, can be changed on a per-AID basis.

The twenty-seventh bit specifies a transmission direction in which the virtual container signal whose output destination has been switched through crossconnect processing is transmitted as an STM frame. Specifically, in the SDH/SONET ring network employing the transmission path 50, the virtual container signal is specified as being output to either the EAST or WEST side.

As in the case of the starting point node 10, even in the case of a change in crossconnect setting of the end point node 30, the change can be specified by the low-order group VC-4 channel number (the thirty-second bit to the thirty-fifth bit), the low-order group VC-12 channel number (the thirty-sixth bit to the forty-first bit), the high-order group VC-4 channel number (the forty-second bit to the forty-fifth bit), and the high-order group VC-12 channel number (the forty-sixth bit to the fifty-first bit).

When the first bit is zero, the change in crossconnect setting is not designated.

The PAC information insert section 15A of the low-order group processing section 15 inserts the PAC information converted into bit information by the PAC information conversion section 13 into a predetermined bit position (e.g., the eighth bit of the K4 byte in the POH in the case of VC-12) in the POH constituting the virtual container formed by the low-order group processing section 15.

Specifically, the PAC information insert section 15A and the PAC information conversion section 13 act as a change insert section which inserts information about a change in path setting received by the path information receiving section 11 into a transmission signal to be transferred from the transmission node 10 to the receiving node 30.

The change in path setting read by the path information receiving section 11 is input to the crossconnect command section 16 along with the information recognized by the insufficient crossconnect information recognition section 12. In accordance with the path setting to be changed by the node 10, the crossconnect command section 16 outputs a crossconnect command to the crossconnect processing section 17.

Therefore, the insufficient crossconnect information recognition section 12, the crossconnect command section 16, and the crossconnect processing section 17, all of which are described above, act as a transmission path setting change section which changes path setting on the basis of the change in path setting of the transmission node 10 among the changes in path setting received by the path information receiving section 11.

As shown in FIG. 4 described above, the PAC information cannot be defined by only one bit. Hence, the PAC information insert section 15A inserts one bit at a time into a position where the PAC information is to be inserted, along the plurality of VC-12 (or VC-4) signals until all of the PAC information items converted by the PAC information conversion sections 13 are inserted.

Put another way, the PAC information of a plurality of bits arranged as shown in FIG. 4 is inserted while being divided on a per-bit basis for insertion into the VC signal.

The node 20 acting as the transit node is placed in a position between the nodes 10 and 30 along the transmission path. The node 20 comprises a high-order group processing section 21, a crossconnect processing section 22, and a high-order group processing section 23. Further, the node 3 comprises a insufficient crossconnect information recognition section 24 corresponding to the insufficient crossconnect information recognition section 12 of the node 10, and a crossconnect command section 25 corresponding to the crossconnect command section 16 of the node 10.

Here, the high-order group processing section 21 separates the STM frame which has been transmitted from the node 10 and addressed to the node 30 into overhead information and a virtual container signal, and has a PAC information reading section 21A for reading PAC information included in the POHs constituting the separated virtual container signal.

The PAC information reading section 21A reads the PAC information arranged as shown in FIG. 4 by reading, as PAC information, the information contained in the bit position of the POH inserted in each VC signal. The PAC information reading section 21A is arranged to detect and refer to the cycle of the bit every time until receipt of all of bit sequences which are recognizable as PAC information.

According to the technique for displaying address information by repetition of bits, a location where the PAC information starts must be determined in advance. For example, when a specific bit pattern is detected from PAC information three times at the same timing, the next bit is stipulated as the start of address information.

In accordance with a command from the crossconnect command section 25, the crossconnect processing section 22 subjects the virtual container signal output from the high-order group processing section 21 to crossconnect processing and outputs the thus-processed signal to the high-order group processing section 23. Specifically, upon receipt of a command for changing crossconnect setting from the crossconnect command section 25, the crossconnect processing section 22 performs crossconnect processing in accordance with the nature of the change.

The high-order group processing section 23 outputs the virtual container signal having been subjected to crossconnect processing by the crossconnect processing section 22 as a signal complying with the format of the output designation path. In the case shown in FIG. 1, the virtual container signal addressed to the node 30 is multiplexed, thereby forming an STM frame and transmitting the frame to the receiving node 30.

Consequently, the above-described high-order group processing section 23 functions as a transit transmission section which passes the transmission signal—into which a change in path setting is inserted—to the receiving node 30 in the path, on the basis of the path setting changed by the insufficient crossconnect information recognition section 24, the crossconnect command section 25, and the crossconnect processing section 22.

Moreover, the PAC information read by the PAC information reading section 21A is input to the insufficient crossconnect information recognition section 24. On the basis of the PAC information, the insufficient crossconnect information recognition section 24 recognizes information which is a crossconnect setting item addressed to the node 20 but is not specified as PAC information.

The crossconnect command section 25 receives the change in crossconnect (including, as well, information which is not specified as a change) which originates from the insufficient crossconnect information recognition section 24 and is addressed to the node, and issues a command for changing settings of crossconnect processing of the crossconnect processing section 22. By means of a change in crossconnect setting of the crossconnect processing section 22, the crossconnect command section can change a set path.

Specifically, the crossconnect command section functions as a transit-node-path-setting change section which changes path setting of the node 20 on the basis of information (PAC information) about the change in path setting, by means of the insufficient crossconnect information recognition section 24, the crossconnect command section 25, and the crossconnect processing section 22, all being described above.

When the PAC information is arranged as shown in FIG. 4, the PAC information does not include crossconnect setting information for the transit node 20. Hence, the insufficient crossconnect information recognition section 24 automatically sets crossconnect setting of the crossconnect processing section 22 and can report the setting to the crossconnect command section 25.

The node 30 acting as a receiving (end point) node includes a high-order group processing section 31, a crossconnect processing section 32, a low-order group processing section 33, and a physical interface section 34. The node 30 further comprises a insufficient crossconnect information recognition section 35 corresponding to the insufficient crossconnect information recognition section 24 of the node 20, and a crossconnect command section 36 corresponding to the crossconnect command section 25 of the node 20.

Here, the high-order group processing section 31 separates the STM frame which has been transmitted from the node 20 and addressed to the node 30 into overhead information and a virtual container signal, and has a PAC information reading section 31A for reading PAC information included in the POHs constituting the separated virtual container signal.

As in the case of the PAC information reading section 21A of the node 20, the PAC information reading section 31A reads the PAC information arranged as shown in FIG. 4 by reading, as PAC information, the information contained in the bit position of the POH inserted in each VC signal. The PAC information reading section 31A is arranged to detect and refer to the cycle of the bit every time until receipt of all of bit sequences which are recognizable as PAC information.

Therefore, the high-order group processing section 31 functions as a second path setting receiving section which receives information (PAC information) about a change in path setting inserted into the transmission signal.

In accordance with a command from the crossconnect command section 36 to be described later, the crossconnect processing section 32 subjects a virtual container signal from the high-order processing section 31 to crossconnect processing, and outputs the signal to the low-order group processing section 33. Specifically, upon receipt of a command for changing crossconnect setting from the crossconnect command section 36, the crossconnect processing section 32 is arranged to perform crossconnect processing in accordance with the nature of the change.

The low-order group processing section 33 processes the virtual container signal that has been subjected to crossconnect processing in the crossconnect processing section 22 into a signal of format complying with the line under command of the node 30. More specifically, when the signal transmitted as the STM frame is output to the line of 2 Mbps (the line E1) provided under command of the node 30, the low-order group processing section 33 processes the virtual container signal sent from the crossconnect processing section 32 into a signal complying with the above-described line E1.

The physical interface section 34 interfaces to a line 42 [e.g., a line of 2 Mbps (line E1)] under command of the node 30.

The insufficient crossconnect information recognition section 35 recognizes, from the PAC information read by the PAC information reading section 31A, information which is a crossconnect setting item for node 30 but is not designated as PAC information.

Upon receipt of the PAC information read by the PAC information reading section 31A along with the information recognized by the insufficient crossconnect information recognition section 35, the crossconnect command section 36 changes the crossconnect setting of the crossconnect processing section 32, so that the set path can be changed by means of a change in the crossconnect setting of the crossconnect processing section 32.

Accordingly, the insufficient crossconnect information recognition section 35, the crossconnect command section 36, and the crossconnect processing section 32, all of which are described above, function as a receiving path setting change section which changes the path setting of the node 30 on the basis of the information about the change in path setting.

In the transmission node 10 configured as mentioned above, crossconnect is set in the following manner.

In the node 10, the path information receiving section 11 receives, as the change in path setting, address information about an input port of the transmission node (a low-order group input port) into which a low-order group signal—being lower in order than a high-order group signal—is input. The insufficient crossconnect information recognition section 12 and the crossconnect command section 16 perform processing for changing the setting of the input port of the node 10, on the basis of the address information received by the path information receiving section 11, thereby effecting setting of crossconnect.

The path information receiving section 11 receives, as the change in path setting, information indicating that the low-order group input port is changed to another, unoccupied input port. The insufficient crossconnect information recognition section 12 and the crossconnect command section 16 retrieve another unoccupied, low-order group input port on the basis of the information received by the path information receiving section 11, and perform setting change processing such that the low-order group input port constituting the set path becomes the retrieved unoccupied input port, thereby effecting setting of crossconnect.

Moreover, the path information receiving section 11 receives, as the change in path setting, address information about an output port of the transmission node (a high-order group output port) from which a high-order group signal—corresponding to the transmission signal—is output. The insufficient crossconnect information recognition section 12 and the crossconnect command section 16 perform processing for changing the setting of the high-order group output port on the basis of the address information received by the path information receiving section 11, thereby effecting setting of crossconnect.

The path information receiving section 11 receives, as the change in path setting, information indicating that the high-order group output port has address information matching the address information about the input port into which the low-order group signal—being lower in degree than the transmission signal—is input. The insufficient crossconnect information recognition section 12 and the crossconnect command section 16 perform setting change processing for changing setting of the high-order group output port constituting the path, on the basis of the information received by the path information receiving section 11.

The path information receiving section 11 receives, as the change in path setting, information indicating that the high-order group input port is changed to another, unoccupied input port. The insufficient crossconnect information recognition section 12 and the crossconnect command section 16 retrieve another unoccupied, high-order group input port on the basis of the information received by the path information receiving section 11, and perform setting change processing such that the high-order group input port constituting the set path becomes the retrieved unoccupied input port, thereby effecting setting of crossconnect.

The mode for changing the path setting of the node 10 includes two types of modes for setting the low-order group input port and three types of modes for setting the high-order group output port, and crossconnect setting can be effected by arbitrarily combining the modes together.

The above-described receiving node 30 sets crossconnect in the modes provided below.

Specifically, the high-order group processing section 31 of the receiving node 30 receives, as the change in path setting (PAC information), address information about an input port of the transmission node 30 (a low-order group input port) into which a low-order group signal—being lower in order than a high-order group signal—is input. The insufficient crossconnect information recognition section 24 and the crossconnect command section 36 perform processing for changing the setting of the input port of the node 30, on the basis of the address information received by the high-order group processing section 31, thereby effecting setting of crossconnect.

The high-order group processing section 31 receives information indicating that the low-order group input port has address information matching the address information about an input port (the high-order group input port) of the receiving node 30 into which a high-order group signal corresponding to the transmission signal is input. The insufficient crossconnect information recognition section 35 and the crossconnect command section 36 perform processing for changing the setting of the high-order group output port 30 on the basis of the address information received by the high-order group processing section 31, thereby effecting setting of crossconnect.

The high-order group processing section 31 receives, as the change in path setting, information indicating that the high-order group output port is changed to another, unoccupied output port. The insufficient crossconnect information recognition section 35 and the crossconnect command section 36 perform setting change processing for changing setting of the high-order group output port constituting the path, on the basis of the information received by the high-order group processing section 31.

In relation to three patterns (high-order group "O," "identical," and "unoccupied" at the starting points in FIG. 5) required when the high-order group output port of the receiving node 30 is set, a path may be set by arbitrarily combinations of the low-order group input ports with the high-order group output ports of the previously-described transmission node 10 [six patterns (combinations of the high-order group pattern of the starting point with the low-order group "O" and "unoccupied" of the starting point in FIG. 5)].

From the path setting operations of the respective nodes 10, 20, and 30 shown in FIG. 1, eighteen patterns of crossconnect setting as shown in FIG. 5 are conceivable as modes for setting crossconnect of the starting point node 10 and that of the end point node 30 by combination of methods for determining the channel numbers of the low-order group input ports and the high-order group output ports of the starting point node 10 with the channel numbers of the low-order group output ports of the end point node 30.

Columns assigned circles in FIG. 5 show a case where channel numbers of ports of interest (the low-order group input ports and the high-order group output ports of the starting point node 10, or the low-order group ports of the end point node 30) are used for the data input from the path information input terminal 60.

The columns given "unoccupied" show a case where unoccupied channels are retrieved and determined as channel numbers of the previously-described ports. The columns given "identical" show a case where those channel numbers which are identical with those of the input ports of the nodes are used as the channel numbers of the output ports of interest (of the starting point node 10 or the end point node 30).

As a result, there can be realized, as pattern 1, a mode for using the data input from the path information input terminal 60 as the channel numbers of the low-order group input ports and those of the high-order group ports of the starting point node 10 and the channel numbers of the low-order group output ports of the end point node 30.

There can be realized, as pattern 2, a mode for using the data input from the path information input terminal 60 as the channel numbers of the low-order group input ports of the starting point node 10 and the channel numbers of the low-order group output ports of the end point node 30; and for using channel numbers identical with those of the low-order group input ports of the node 10 for the channel numbers of the high-order group ports of the starting point node 10.

Further, there can be realized, as pattern 3, a mode for using the data input from the path information input terminal 60 as the channel numbers of the low-order group input ports of the starting point node 10 and the channel numbers of the low-order group output ports of the end point node 30; and for retrieving and determining unoccupied channels for the high-order group output ports of the starting point node 10.

There can be realized, as pattern 4, a mode for using the data input from the path information input terminal 60 as the channel numbers of the low-order group input ports and those of the high-order group output ports of the starting point node 10; and for using channel numbers identical with those of the low-order group input ports of the node 10 for the channel numbers of the high-order group ports of the end point node 30.

There can be realized, as pattern 5, a mode for using the data input from the path information input terminal 60as the channel numbers of the low-order group input ports of the starting point node 10; for using channel numbers identical with those of the low-order group input ports of the node 10 for the channel numbers of the high-order group ports of the starting point node 10; and for using those channel numbers identical with the channel numbers of the high-order group input ports of the node 30 for the channels numbers of the low-order group output ports of the end point node 30.

There can be realized, as pattern 6, a mode for using the data input from the path information input terminal 60 as the channel numbers of the low-order group input ports of the starting point node 10; for retrieving and determining unoccupied channels for the high-order group output ports of the starting point node 10; and for using those channel numbers identical with the channel numbers of the high-order group input ports of the node 30 for the channels numbers of the low-order group output ports of the end point node 30.

There can be realized, as pattern 7, a mode for using the data input from the path information input terminal 60 as the channel numbers of the low-order group input ports and those of the high-order group input ports of the starting point node 10; and for retrieving and determining unoccupied channels for the high-order group output ports of the end point node 30.

There can be realized, as pattern 8, a mode for using the data input from the path information input terminal 60 as the channel numbers of the low-order group input ports of the starting point node 10; for using channel numbers identical with those of the low-order group input ports of the node 10 for the channel numbers of the high-order group ports of the starting point node 10; and for retrieving and determining unoccupied channels for the low-order group output ports of the end point node 30.

There can be realized, as pattern 9, a mode for using the data input from the path information input terminal 60 as the channel numbers of the low-order group input ports of the starting point node 10; for retrieving and determining unoccupied channels for the high-order group output ports of the starting point node 10; and for retrieving and determining unoccupied channels for the low-order group output ports of the end point node 30.

There can be realized, as pattern 10, a mode for retrieving and determining unoccupied channels for the low-order group input ports of the starting point node 10; and using the data input from the path information input terminal 60 as the channel numbers of the high-order group input ports of the starting point node 10 and the channel numbers of the low-order group output ports of the end point node 30.

There can be realized, as pattern 11, a mode for retrieving and determining unoccupied channels for the low-order group input ports of the starting point node 10; using those channel numbers identical with those channel numbers of the low-order group input ports of the node 10 as the channel numbers of the high-order group input ports of the starting point node 10; and using the data input from the path information input terminal 60 as the channel numbers of the low-order group output ports of the end point node 30.

There can be realized, as pattern 12, a mode for retrieving and determining unoccupied channels for the low-order group input ports and high-order group output ports of the starting point node 10; and using the data input from the path information input terminal 60 as the channel numbers of the low-order group output ports of the end point node 30.

There can be realized, as pattern 13, a mode for retrieving and determining unoccupied channels for the low-order group input ports of the starting point node 10; using the data input from the path information input terminal 60 as the channel numbers of the high-order group output ports of the starting point node 10; and using those channel numbers identical with those channel numbers of the low-order group input ports of the node 10 as the channel numbers of the high-order group input ports of the end point node 30.

There can be realized, as pattern 14, a mode for retrieving and determining unoccupied channels for the low-order group input ports of the starting point node 10; using those channel numbers identical with those channel numbers of the low-order group input ports of the node 10 as the channel numbers of the high-order group input ports of the starting point node 10; and using those channel numbers identical with the high-order group input ports of the node 30 as the channel numbers of the low-order group output ports of the end point node 30.

There can be realized, as pattern 15, a mode for retrieving and determining unoccupied channels for the low-order group input ports of the starting point node 10; retrieving and determining unoccupied channels for the high-order group output ports of the starting point node 10; and using those channel numbers identical with the high-order group input ports of the node 30 as the channel numbers of the low-order group output ports of the end point node 30.

There can be realized, as pattern 16, a mode for retrieving and determining unoccupied channels for the low-order group input ports of the starting point node 10; using the data input from the path information input terminal 60 as the channel numbers of the high-order group output ports of the starting point node 10; and retrieving and determining unoccupied channels for the high-order group output ports of the end point node 30.

There can be realized, as pattern 17, a mode for retrieving and determining unoccupied channels for the low-order group input ports of the starting point node 10; using those channel numbers identical with those channel numbers of the low-order group input ports of the node 10 as the channel numbers of the high-order group input ports of the starting point node 10; and retrieving and determining unoccupied channels for the low-order group output ports of the end point node 30.

There can be realized, as pattern 18, a mode for retrieving and determining unoccupied channels for the low-order group input ports and the channel numbers of the high-order group output ports of the starting point node 10 and the channel numbers of the low-order group output port of the end point node 30.

Operation of the transmission network system according to the embodiment of the present invention having the foregoing configuration achieved when a path is set in the transmission node 10, the transit node 20, and the receiving node 30 will be described by reference to flowcharts shown in FIGS. 7 through 12.

Figure 7:
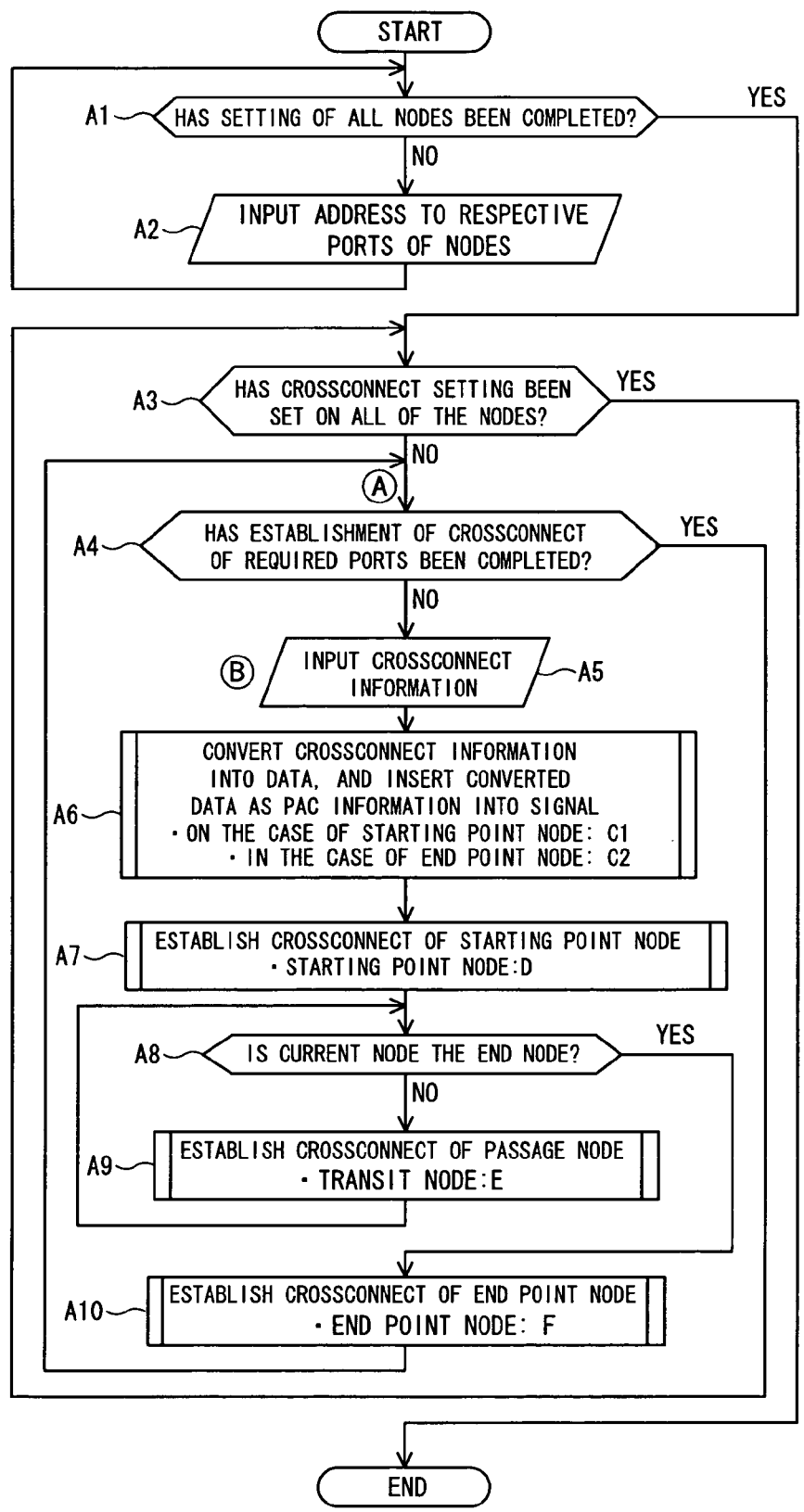
FIGS. 7 through 12 are flowcharts for describing operation of the transmission network of the present invention.

AIDs serving as address information are defined, as initial settings, with respect to the input/output ports of all of the nodes 10, 20, and 30 constituting the transmission network system 1 (steps A1 and A2 shown in FIG. 7). Specifically, the AIDs can have been input in advance by way of unillustrated input terminals connected to the respective nodes 10, 20, and 30.

Subsequently, the information used for setting a path so as to pass through the nodes 10, 20, and 30 is input by way of the path information input terminal 60 connected to the transmission node 10. At this time, the crossconnect setting information or the like about the nodes 10, 20, and 30 is sequentially input on each path to be set. Specifically, when crossconnect setting information about the node 10 to be used for setting a certain path is input, crossconnect setting information about the node 20 to be used for setting the path and crossconnect setting information about the node 30 to be used for setting the path are sequentially input (a route through NO in step A3 and NO in step S4, both being shown in FIG. 7, to step A5).

The information used for setting a path which has been input on a per-path basis as mentioned above is read by the path information reading section 11. The insufficient crossconnect information recognition section 12 recognizes information about items which have not yet been input by way of the path information input terminal 60, among the crossconnect setting items used when crossconnect is set in the node 10.

The PAC information conversion section 13 of the transmission node 10 converts the input crossconnect setting information into bit data such as those shown in FIG. 4. The PAC information insert section 15A inserts the converted data into a signal serving as PAC information; specifically, in a predetermined position of the POH constituting a virtual container signal (step A6 in FIG. 7).

As mentioned above, the virtual container signal into which the PAC information is inserted is subjected to crossconnect processing in the crossconnect processing section 17. Crossconnect setting to be performed by the crossconnect processing section 17 is set on the basis of a command from the crossconnect command section 16 (step A7 in FIG. 7).

When the crossconnect setting is effected in accordance with the command from the above-described crossconnect command section 16, the virtual container signal into which the PAC information is inserted is subjected to crossconnect processing in the crossconnect processing section 17. The high-order group processing section 18 multiplexes the virtual container signals on each of the AIDs of the high-order group output ports, and the thus-multiplexed signal is transmitted as an STM frame to the receiving node 30 by way of the transit node 20.

Even in the transit node 20 and the end point node 30, the PAC information reading section 21A and the PAC information reading section 31A read the PAC information transmitted while being contained in the STM frame. As in the case of the starting point node 10, the crossconnect settings of the crossconnect processing sections 22, 32 are sequentially set in accordance with the commands from the crossconnect command sections 25, 36 (step A8 to step A10).

By means of processing pertaining to steps A5 to A10, crossconnect is set on a per-path basis. However, as in the case mentioned above, crossconnect is set in the respective nodes 10, 20, and 30 on a per-path basis with respect to all other paths to be set (a route through NO in step A4 subsequent to step A10 to step A10). As a result, the paths can be set for all of the nodes constituting the SDH/SONET network (a route through YES in step A4 to step A3).

Figure 6:
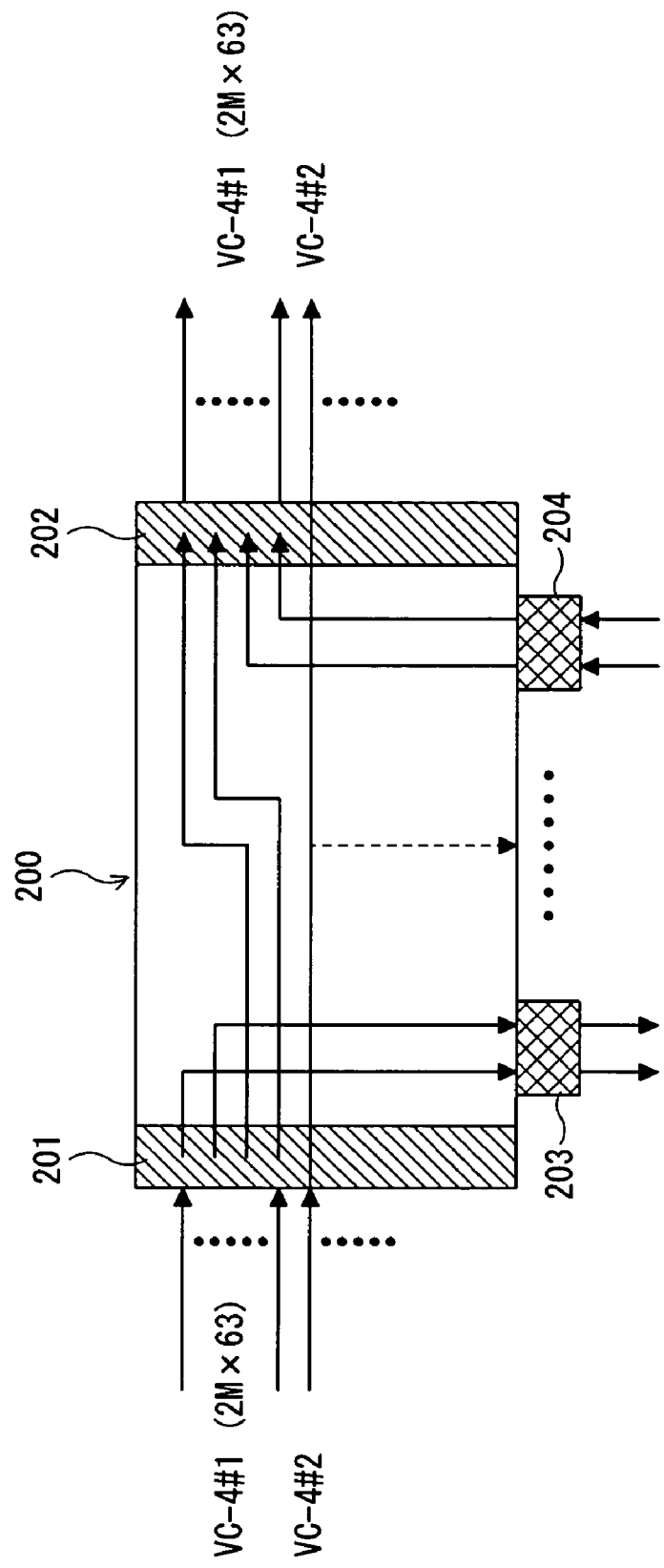
FIG. 6 is a view for describing operation achieved when a node constituting a ring network offers communication service by means of ADM (Add-Drop Multiplexing)

For instance, it is assumed that a node 200 constituting the ring network as the SDH/SONET network such as that shown in FIG. 6 is about to offer communication service by means of typical ADM (Add Drop Multiplexing). Traffic exists in a tributary side and an aggregate side, and there is a necessity for setting crossconnect. However, crossconnect can be automatically generated by sending the above-described PAC information from the node which is to become the starting point of respective paths.

In the node 200 shown in FIG. 6, the node 200 operates as an end point node (see reference numeral 30 in FIG. 1) in a path in which signals are input from an aggregate interface 201 on the WEST side (or an aggregate interface 202 on the EAST side) and are output to an output port 203 serving as a tributary interface. In the path connecting between the aggregate interfaces 201, 202, the node 200 operates as a transit node (see reference numeral 20 in FIG. 1). In this case, the starting point node (see reference numeral 10 in FIG. 1) acquired when the PAC information is generated turns into another node in the unillustrated ring network.

In the path in which signals are input from an input port 204 serving as a tributary interface and output to the aggregate interface 202 on the EAST side (or the aggregate interface 201 on WEST side), the node 200 operates as a starting point node (see reference numeral 10 in FIG. 1).

When there is set a path along which the node 200 operates as the starting point node 10, the node 200 itself sets the PAC information. When there is set a path along which the node 200 operates as the end point node 30, PAC information is set at a node which is to become the starting point of the path in the ring network. Specific setting parameters correspond to via node numbers and a destination AID, as mentioned previously.

On the basis of the via node number, the path information input terminal 60 used for entering path information to be set determines whether or not a signal passes through the aggregate interface 202 on the EAST side or the aggregate interface 201 on the WEST side. By means of operation of the path information receiving section 11, that of the insufficient crossconnect information recognition section 12, and that of the crossconnect command section 16, the path information input terminal makes setting of crossconnect processing to be performed by the crossconnect processing section 17.

For instance, under circumstances where the line of 2 Mbps (the line E1) is accommodated in the output port (the line E1) 203 and the input port 204, when crossconnect is set to link the channel number of the input port 204 serving as the tributary interface of the node 200 to the aggregate interface 202 on the EAST side, the channel of the input port 204 belonging to the low-order group side is sequentially linked to the first VC-4 slot of the high-order group interface 202 and subsequent slots of the same, thereby effecting crossconnect.

In the case of such a path of 2 Mbps, a path is set one by one. However, when the STM-1/4 signal undergoes add and drop in midway through setting, a fractional number of VC-12 signals is bypassed, and the next VC-4 is used.

When a path where the node 200 operates as the end point node 30 is set, the PAC information reading section 31A reads the PAC information included in the POH of the VC signal (the VC-12 signal or the VC-4 signal) constituting the STM frame transmitted from the node which serves as the starting point of the path, and makes required crossconnect setting by means of operation of the insufficient crossconnect recognition section 35 and that of the crossconnect command section 36.

Similarly, for instance, the STM frame input from the aggregate interface 201 on the WEST side drops the signal addressed to the node 200. After having been subjected to crossconnect processing in the crossconnect processing section (see reference numeral 22 shown in FIG. 1), the signals addressed to other nodes are transmitted from the aggregate interface on the EAST side (see the high-order group processing section 23 shown in FIG. 1).

Crossconnect setting is sequentially effected from the first VC-4 slot with respect to the channel of 2 Mbps that does not undergo add and drop, whereby a bandwidth can be efficiently utilized. Similarly, the STM-1/4 by passes the fractional number of channels of 2 Mbps, and the next VC-4 is used.

Figure 8:
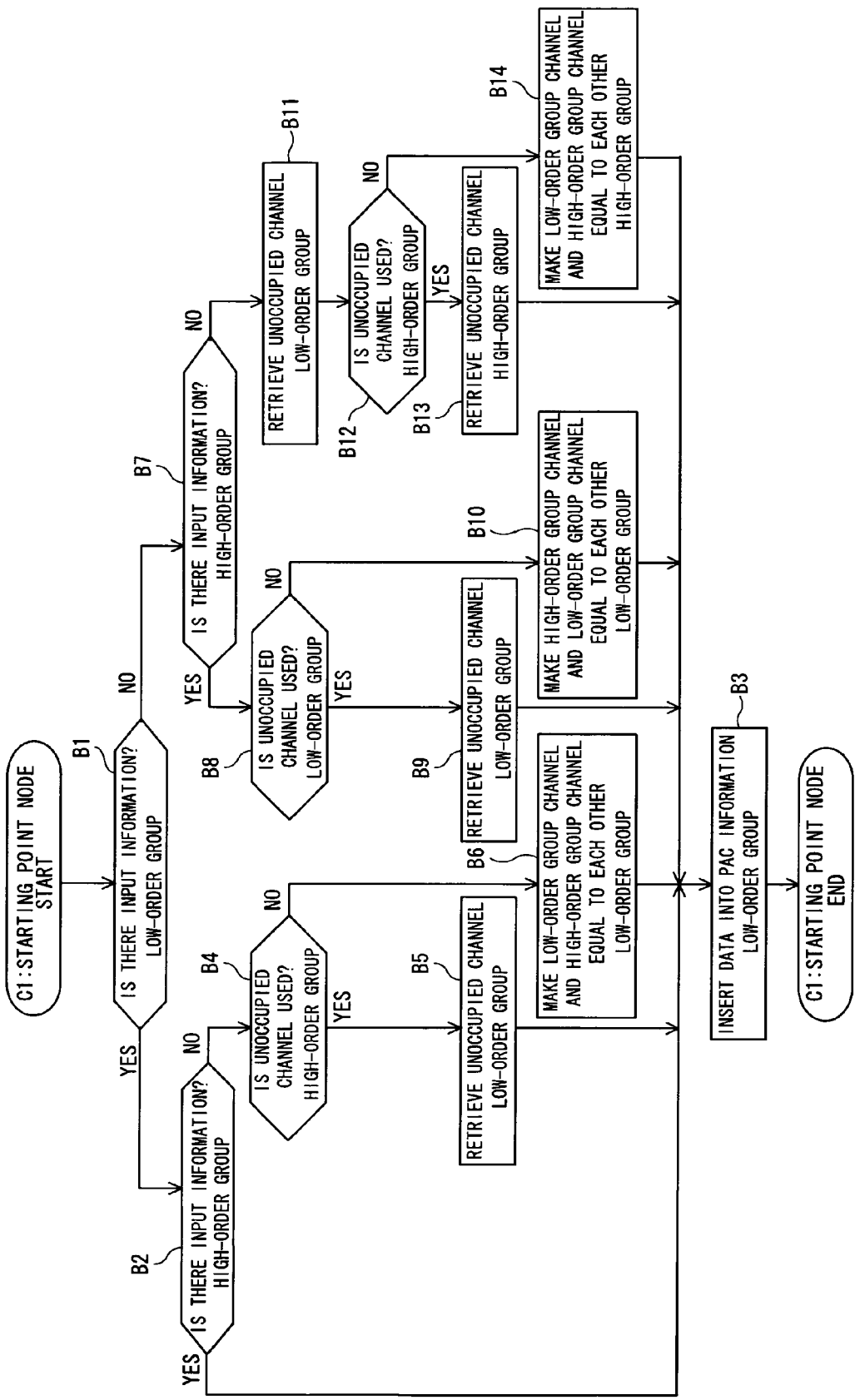

Processing for inserting PAC information to be performed by the PAC information conversion section 13 and the PAC information insert section 15A at the starting point node 10 and in step A6 shown in FIG. 7 will be described in detail by reference to the flowchart shown in FIG. 8.

When the insufficient crossconnect information recognition section 12 has recognized that both AID (channel number) information about low-order group input ports and AID 8 channel) information about high-order group output ports among the setting items required by the node 10 to set crossconnect have been input (a route from YES in step B1 to YES in step B2), the insufficient crossconnect information recognition section 12 passes the input crossconnect setting information, in an unmodified form, to the PAC information conversion section 13 and the crossconnect command section 16.

The PAC information conversion section 13 converts the thus-input AID (channel number) information into bit information without modification, whereupon the information is converted into the PAC information. The PAC information is inserted into the virtual container signal (step B3).

At this time, the level of AID information is caused to correspond to the level of the virtual container signal to be inserted into the POH as PAC information. Specifically, the AID (channel number) information specified by the level of VC-12 is inserted into the POH of the VC-12 signal, and the AID (channel number) information specified by the level of VC-4 is inserted into the POH of the VC-4 signal.

All of the AID information items about the low-order group input ports have already been input to the insufficient crossconnect information recognition section 12. However, when not all of the AID information items about the high-order group output ports are recognized as having been input (a route from YES in step B1 to NO in step B2), the insufficient crossconnect recognition section 12 determines the high-order group output ports into which the AID information has not yet been input.

Here, when unoccupied channels of the high-order group output ports are used for determining the high-order group output ports into which the AID information has not yet been input, the unoccupied channels are retrieved (a route from YES in step B4 to step B5).

Thus, the insufficient crossconnect information recognition section 12 automatically replenishs the deficient crossconnect setting information and passes the thus-replenished information to the PAC information conversion section 13 and the crossconnect command section 16 as the crossconnect setting information not including deficiencies. The PAC information conversion section 13 converts the crossconnect setting information passed from the insufficient crossconnect information recognition section 12 into PAC information, and inserts the PAC information into the POH of the virtual container signal (step B3).

When the unoccupied channels of the high-order group output ports are not used for determining the high-order group output ports to which the information has not yet been input, channels numbers identical with the channel numbers (AIDS) of the low-order group input ports are determined as channel numbers (AIDs) of the high-order group output ports (a route from NO in step B4 to step B6).

As mentioned above, the insufficient crossconnect information recognition section 12 automatically replenishs the deficient crossconnect setting information and passes the thus-replenished information to the PAC information conversion section 13 and the crossconnect command section 16 as the crossconnect setting information not including deficiencies. The PAC information conversion section 13 converts the crossconnect setting information passed from the insufficient crossconnect information recognition section 12 into PAC information, and inserts the PAC information into the POH of the virtual container signal (step B3).

When the insufficient crossconnect information recognition section 12 recognizes that not all of the AID information items about the low-order group input ports have been input and all of the AID information items about the high- order group output ports have been input (a route from NO in step B1 to YES in step B7), the insufficient crossconnect information recognition section 12 determines the low-order group input ports into which information has not yet been input.

Specifically, in a case where the low-order group input ports into which information has not yet been input are determined, when unoccupied channels of the low-order group input ports are used, the unoccupied channels are retrieved (a route from YES in step B8 to step B9).

As mentioned above, the insufficient crossconnect information recognition section 12 automatically replenishs the deficient crossconnect setting information and passes the thus-replenished information to the PAC information conversion section 13 and the crossconnect command section 16 as the crossconnect setting information not including deficiencies. The PAC information conversion section 13 converts the crossconnect setting information passed from the insufficient crossconnect information recognition section 12 into PAC information, and inserts the PAC information into the POH of the virtual container signal (step B3).

When the unoccupied channels of the low-order group input ports are not used for determining the high-order group output ports to which the information has not yet been input, channels numbers identical with the channel numbers (AIDs) of the low-order group input ports are determined as channel numbers (AIDs) of the high-order group output ports (a route from NO in step B8 to step B10).

As mentioned above, the insufficient crossconnect information recognition section 12 automatically replenishs the deficient crossconnect setting information and passes the thus-replenished information to the PAC information conversion section 13 and the crossconnect command section 16 as the crossconnect setting information not including deficiencies. The PAC information conversion section 13 converts the crossconnect setting information passed from the insufficient crossconnect information recognition section 12 into PAC information, and inserts the PAC information into the POH of the virtual container signal (step B3).

When the insufficient crossconnect information recognition section 12 recognizes that not all of the AID information items about the low-order group input ports have been input and not all of the AID information items about the high-order group output ports have been input (a route from NO in step B1 to NO in step B7), the insufficient crossconnect information recognition section 12 determines the low-order group input ports into which information has not yet been input and the high-order group output ports.

At this time, when low-order group input ports are determined, unoccupied channels are retrieved and determined (step B11). Meanwhile, when high-order group output ports are determined, unoccupied channels of the high-order group output ports are retrieved and determined (a route from YES in step B12 to step B13). Alternatively, those channel numbers identical with the channel numbers (AIDs) of the low-order group input ports that have already been determined are determined as channel numbers (AIDS) of the high-order group output ports (a route from NO in step B12 to step B14).

As mentioned above, the insufficient crossconnect information recognition section 12 automatically replenishs the deficient crossconnect setting information and passes the thus-replenished information to the PAC information conversion section 13 and the crossconnect command section 16 as the crossconnect setting information not including deficiencies. The PAC information conversion section 13 converts the crossconnect setting information passed from the insufficient crossconnect information recognition section 12 into PAC information, and inserts the PAC information into the POH of the virtual container signal (step B3).

In steps B1, B2, and B7 set forth, a determination is made as to whether or not there is input information about the AID information concerning the low-order group input ports or high-order group output ports (whether or not there is the an input from the path information input terminal 60). The expression "not all of the AID information items have been input" used herein implies a case where high-order AID information items have been input but low-order AID information items have not yet been input, as well as a case where neither high-order nor low-order AID information items have been input.

For instance, in a case where the channel number of VC-4 level is set but the channel number of VC-12 level is not set, all of the AID information items are not input. Hence, the insufficient crossconnect information recognition section 12 determines the channel numbers of VC-12 level that have not yet been input.

Figure 9:
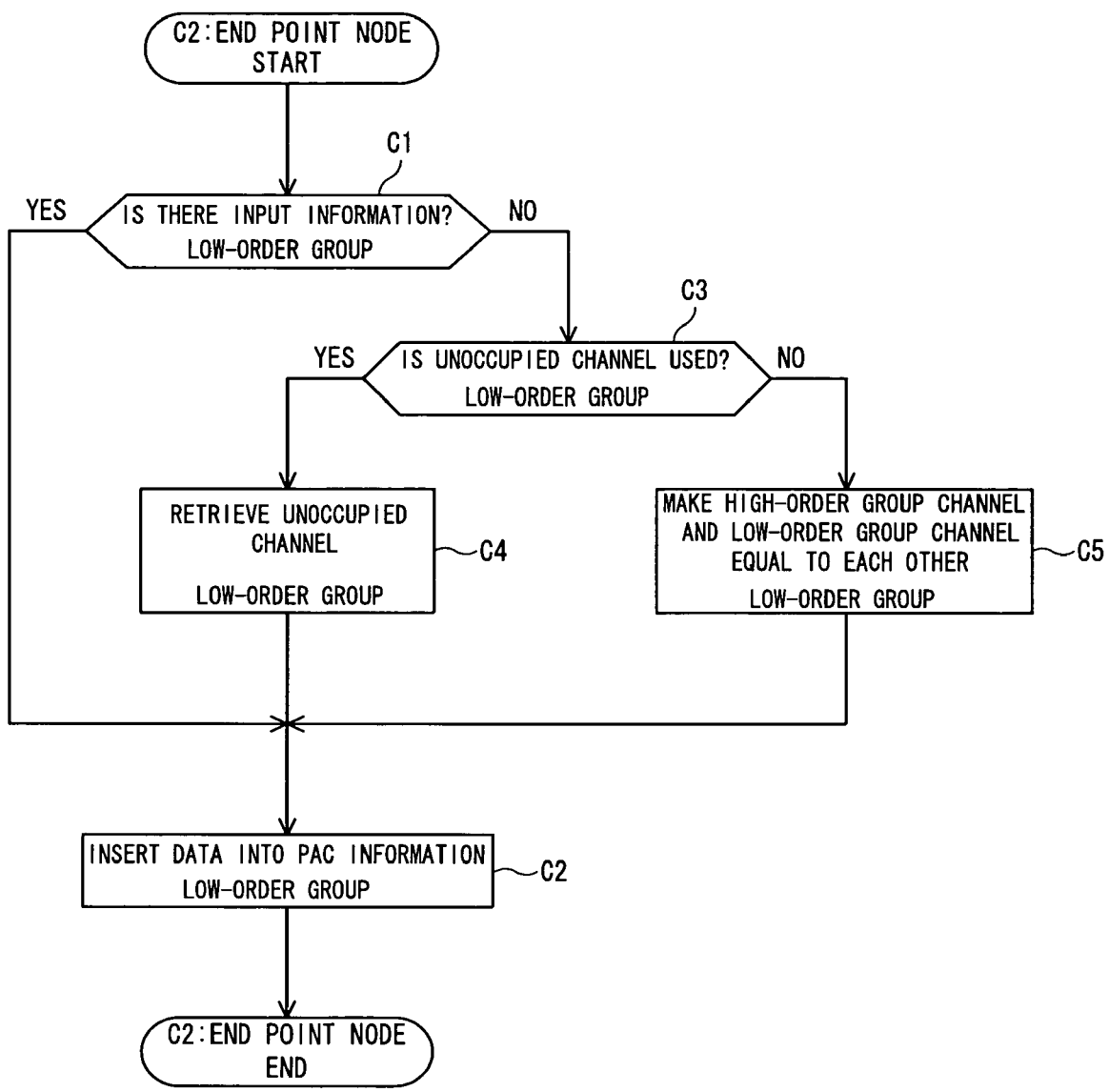

Subsequent to the above-described descriptions about the embodiment in which crossconnect information is inserted into the POH at the starting point node 10, details on the processing to be performed by the insufficient crossconnect information recognition section 35 of the end point node 30 (see step 6 in FIG. 7) will be described by reference to the flowchart shown in FIG. 9.

Specifically, when the insufficient crossconnect information recognition section 32 has recognized that all of the AID (channel number) information items about the low-order group output ports of the crossconnect processing section 32 among the setting items required for the node 30 to set crossconnect have been input (when NO is selected in step C1), the insufficient crossconnect information recognition section 35 passes the thus-input AID (channel number) information items to the crossconnect command section 36 (step C2).

When all of the AID information items about the low-order group output ports are not input to the insufficient crossconnect information recognition section 35 (when NO is selected in step C1), the insufficient crossconnect information recognition section 35 determines the low-order group output ports into which the AID information has not yet been input.

Specifically, when unoccupied channels of the low-order group output ports are used for determining low-order group output ports into which the AID information has not yet been input, the unoccupied channels are retrieved (a route from YES in step C3 to step C4). The insufficient crossconnect information recognition section 35 passes channel numbers of the thus-retrieved unoccupied channels to the crossconnect command section 36 (step C2).

When the unoccupied channels of the low-order group output ports are not used for determining low-order group output ports into which the AID information has not yet been input, those channel numbers identical with the channel numbers (AIDs) of the high-order group input ports are determined as the channel numbers (AIDs) of the low-order group output ports (a route from NO in step C3 to step C5). The insufficient crossconnect information recognition section 35 passes the channel numbers of the retrieved, unoccupied channels to the crossconnect command section 36 (step C2).

Figure 10:
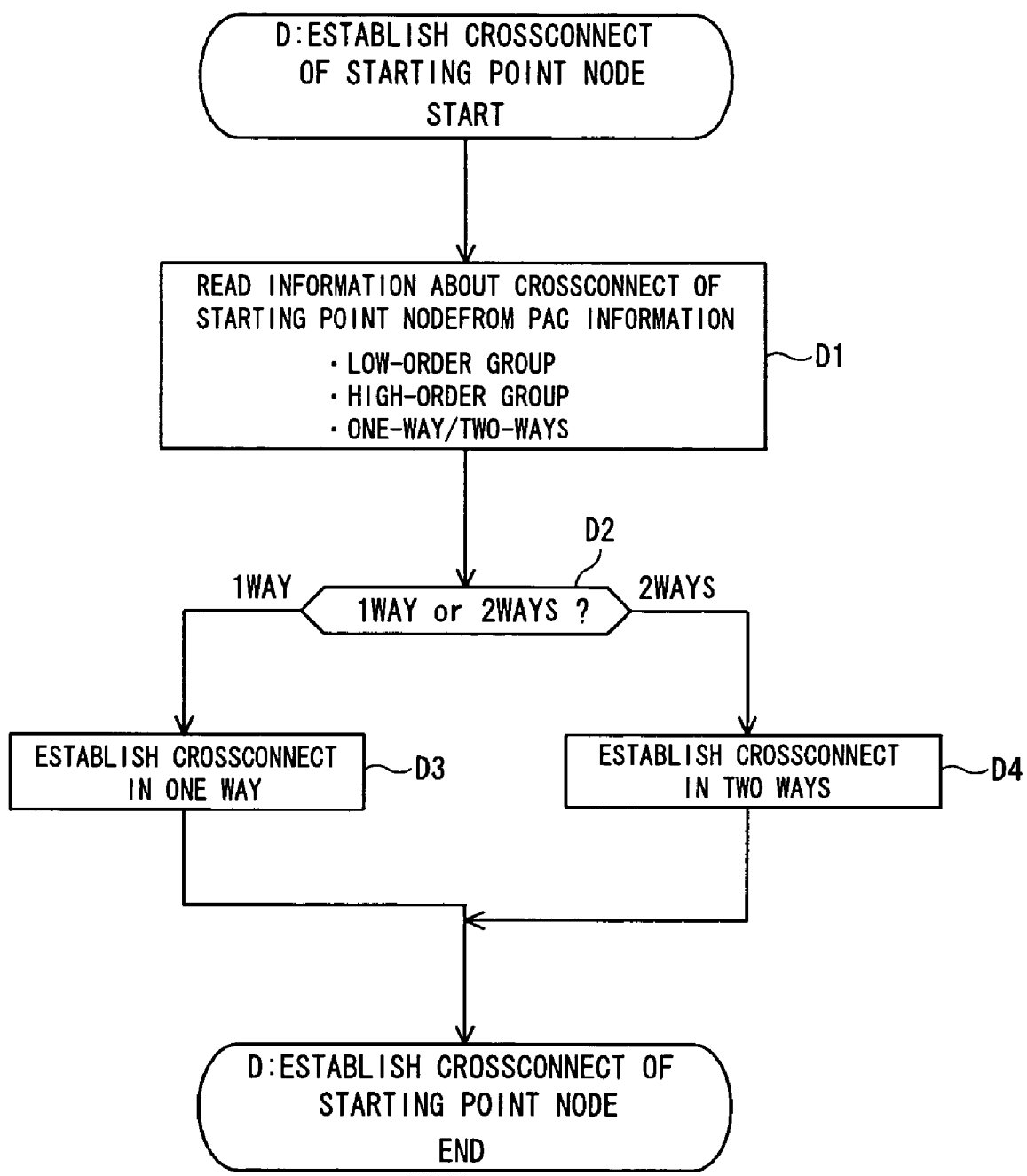

Crossconnect setting operation to be performed at the starting point node 10 in step A7 of the flowchart shown in FIG. 7 will be described by reference to the flowchart shown in FIG. 10.

The crossconnect command section 16 reads information used for setting a path in one way or two ways along with the channel numbers of the low-order group input ports and the high-order group output ports as the crossconnect setting information from the insufficient crossconnect information recognition section 12 (step D1). Crossconnect is set in one way or two ways in accordance with the read channel numbers of the low-order group input ports and the channel numbers of the high-order group output ports, by means of outputting a command to the crossconnect processing section 17 (steps D2 to D4).

Figure 11:
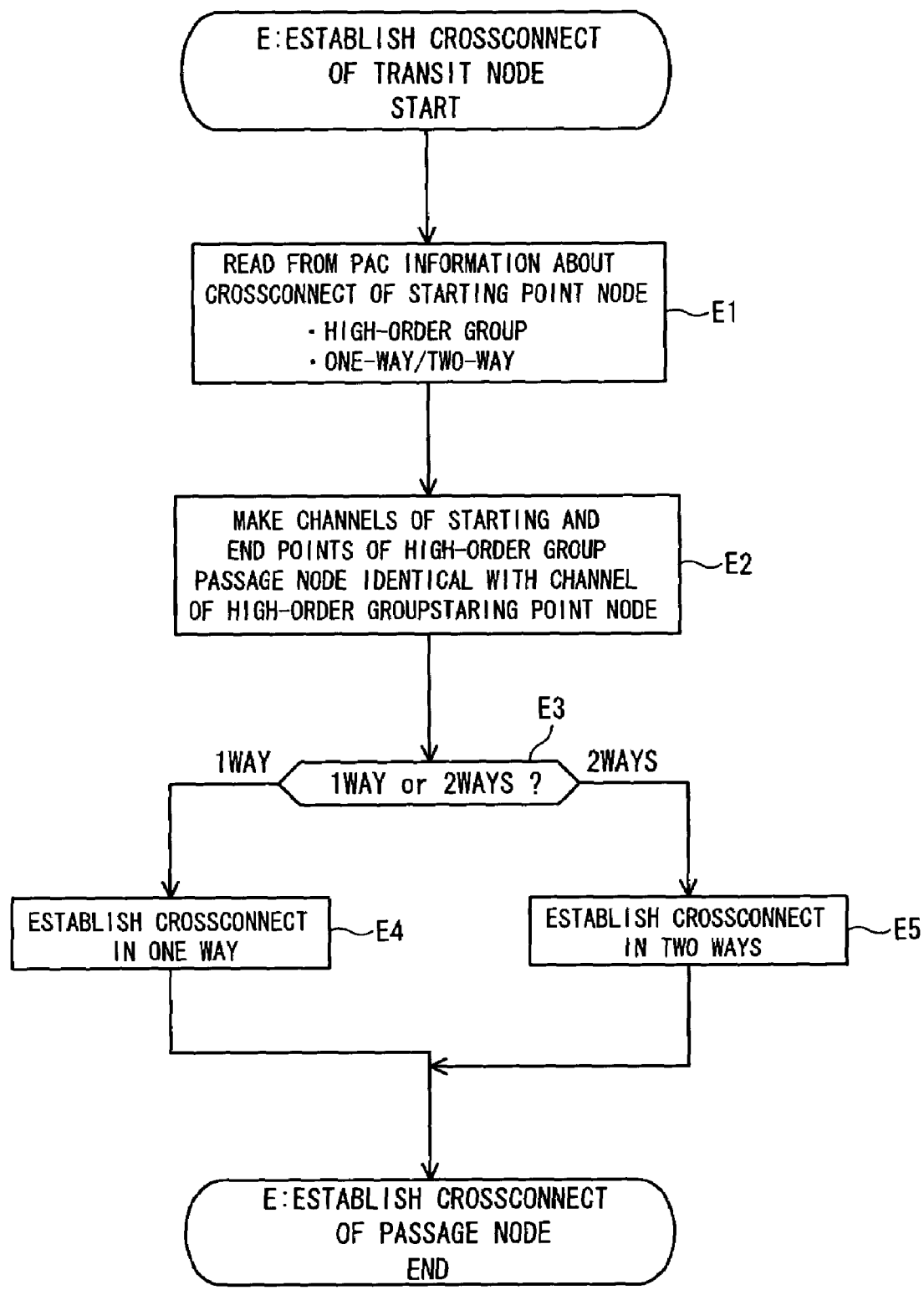

Subsequently, processing for setting crossconnect at the transit node 20 in step A9 of the flowchart shown in FIG. 7 will be described by reference to the flowchart shown in FIG. 11.

For instance, when the PAC information such as that shown in FIG. 4 is used, the crossconnect setting made in the transit node 20 is not included in the PAC information. Hence, the insufficient crossconnect information recognition section 24 determines, from the PAC information read by the PAC information reading section 21A, crossconnect setting required by the crossconnect processing section 22.

Specifically, the insufficient crossconnect information recognition section 24 reads, from the result of reading of the PAC information, information about whether the crossconnect setting is in one way or two ways along with the channel numbers of the high-order group output ports as crossconnect setting information about the starting point node 10 (step E1).

On the basis of the read crossconnect setting information, the insufficient crossconnect information recognition section 24 makes the channels of the starting and end points of the high-order group of the transit node 20 identical with the channels of the high-order group of the starting point node 10. Specifically, crossconnect information is determined such that the channel numbers of the high-order group input ports and those of the high-order group output ports become identical with the channel numbers of the high-order group output ports of the starting node 10 (step E2).

The insufficient crossconnect information recognition section 24 passes the thus-determined crossconnect information to the crossconnect command section 25. The crossconnect command section 25 determines crossconnect in one way or two ways, through use of the channel numbers of the high-order group input ports and those of the high-order group output ports, which have been determined by outputting the command to the crossconnect processing section 22 (steps E3 to E5).

Figure 12:
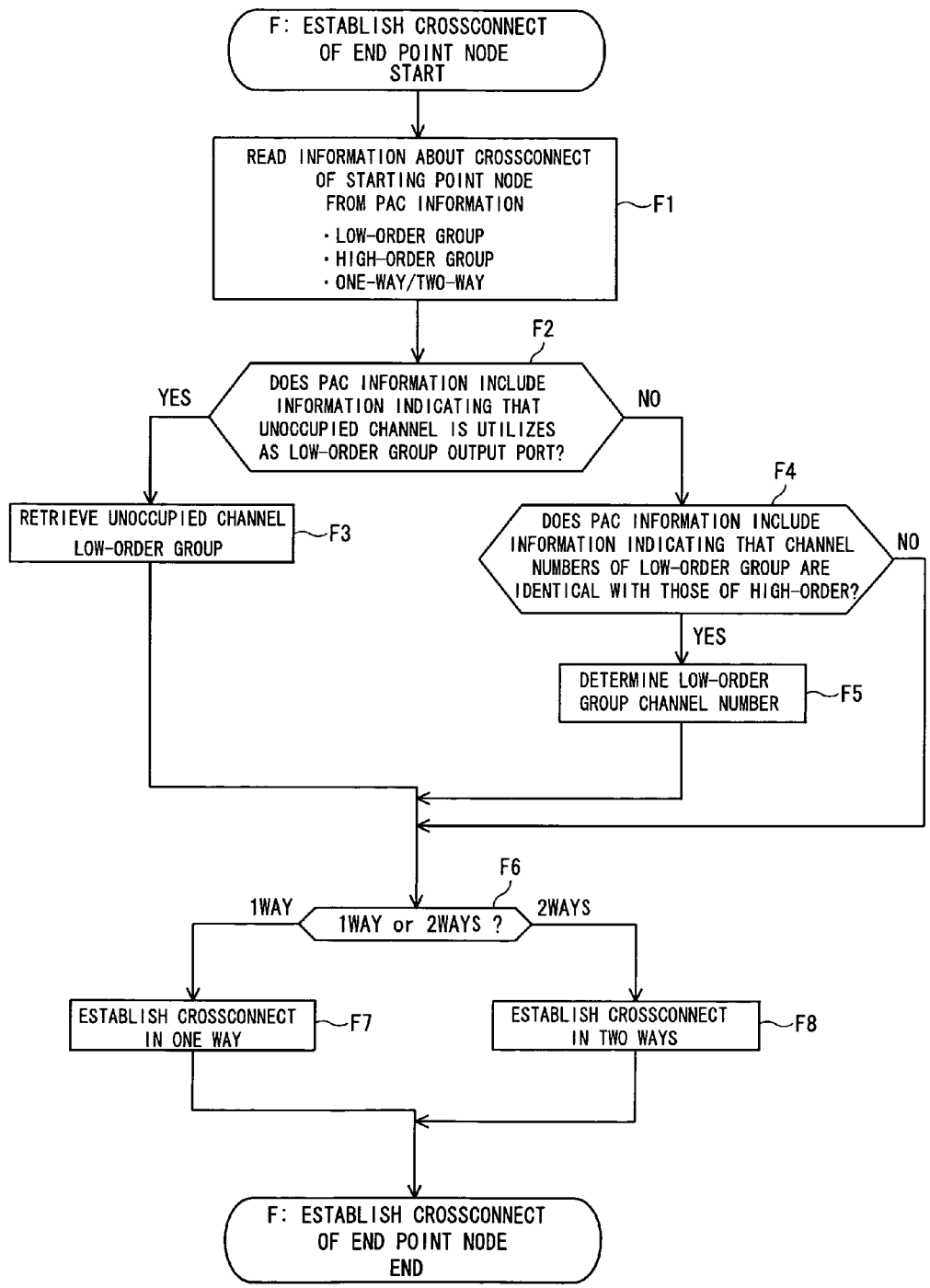

Processing for setting crossconnect at the end point node 30 in step A10 of the flowchart shown in FIG. 7 will be described by reference to the flowchart shown in FIG. 12.

The insufficient crossconnect information recognition section 35 reads, from the result of reading of the PAC information performed by the PAC information reading section 31A, information about whether the crossconnect setting is in one way or two ways along with the channel numbers of the high-order group output ports and those of the low-order group output ports as crossconnect setting information about the end point node 30 (step F1).

When the channel number data pertaining to the low-order group output ports—which are the previously-described crossconnect setting information about the end point node 30—correspond to the data representing "unoccupied channels," the insufficient crossconnect information recognition section 35 retrieves unoccupied channels and determines the thus-retrieved unoccupied channels as channels of the low-order group output ports (a route from YES in step F2 to step F3).

The insufficient crossconnect information recognition section 35 determines the channel numbers of the low-order group output ports which serve as crossconnect setting information about the previously-described end point node 30 as being identical with the channel numbers of the high-order group input ports. When the data represent that "channel numbers identical with the channel numbers of the high-order group input ports are used," the insufficient crossconnect information recognition section 35 determines the channel numbers of the low-order group output ports as being identical with the channel numbers of the high-order group input ports (NO route in step F2, and a route from YES in step F4 to step F5).

The insufficient crossconnect information recognition section 35 passes the thus-determined crossconnect information to the crossconnect command section 36. The crossconnect command section 36 outputs a command to the crossconnect processing section 32, and the determined channel numbers of the low-order group output ports and the channel numbers of the high-order group output ports are used, whereby crossconnect is set in one way or two ways (steps F6 to F8).

Thus, according to the transmission network system of the embodiment of the present invention, the PAC information imparted with the crossconnect information about the receiving node 30 can be reported along with the crossconnect information about the transmission node 10 by inserting the PAC information into the transmission signal, through use of the PAC information conversion section 13 and the PAC information insert section 15A of the transmission node 10. Hence, crossconnect setting including the crossconnect setting of the transit node 20 can be automatically processed, and setting of the crossconnect between nodes can be effected while personal setting is minimized, thereby yielding an advantage of preventing erroneous setting, which would otherwise be caused by an error in personal setting. In addition, there is negated a necessity for setting a crossconnect for the transmission node 10, the transit node 20, and the receiving node 30, respectively. A time required by personal setting is shortened by leaps and bounds, which in turn yields an advantage of significant curtailing labor cost.

Although the previously-described embodiment illustrates only a single node 20 as the transit node 20 in the transmission network 1, the present invention is not limited to the embodiment. The present invention can also be applied to a case where there is set a path which passes a signal through a plurality of transit nodes 20 from the transmission node 10 to the receiving node 30. As the number of transit nodes 20 is increased, an attempt can be made to shorten the time, which is consumed by personal setting, by means of automatically setting crossconnect more efficiently.

The present invention can be carried out while being variously modified within the scope of the invention regardless of the previously-described embodiment.

Persons skilled in the art can manufacture the transmission network system, so long as the embodiments of the present invention are disclosed.

INDUSTRIAL APPLICABILITY

As has been described, the transmission network system of the present invention is useful for changing setting of a path, and particularly, suitable for changing setting of a path of nodes in a synchronous network, such as an SDH (Synchronous Digital Hierarchy) or a SONET (Synchronous Optical Network).

What is claimed is:

1. A transmission network comprising a transmission node and a receiving node, wherein a path is set between said transmission node and said receiving node and a transmission signal of a high-order group signal containing a low-order group signal is transmitted between the nodes, wherein
said transmission node comprises:
a first path-setting-receiving section for receiving a content of a change in a path setting when said path setting to be applied to said transmission signal is changed;
a transmission-path-setting change section for changing a path setting of said transmission node based on said content received by said first path-setting-receiving section; and
a change insertion section for reporting information about said content of the change in path setting received by said first path-setting-receiving section to said receiving node by inserting said information into said transmission signal to be transmitted from said transmission node to said receiving node; and wherein
said receiving node comprises:
a second path-setting-receiving section for receiving information about said change in path setting inserted into said transmission signal from said transmission node; and
a receiving-path-setting change section for changing a path setting of a node based on said information about said change in path setting received by said second path-setting-receiving section, wherein,
said transmission-path-setting change section comprises:
a crossconnect processing section that subjects a low-order group signal to crossconnect processing based on a crossconnect setting to define a transmission path of the low-order group signal to be transmitted to said receiving node; and
a crossconnect command section that commands said crossconnect processing section to change the crossconnect setting based on the change in the path setting received by said first path-setting-receiving section.

2. The transmission network according to claim 1, wherein said path between said transmission node and said receiving node is set by way of a transit node; and wherein
said transit node on said path comprises:
a section which receives information about said change in path setting inserted in said transmission signal;
a transit-node-path-setting change section which changes a path setting of a node on the basis of information about said change in path setting; and
a transit transmission section which passes a transmission signal into which said change in path setting is inserted to said receiving node on said path, on the basis of said path setting changed by said transit-node-path-setting change section.

3. The transmission network according to claim 1, wherein said first path-setting-receiving section of said transmission node receives, as said change in path setting, address information about an input port of said transmission node into which a low-order group signal contained in said transmission signal is to be input; and
said transmission-path-setting change section changes settings of an input port of said transmission node in accordance with said address information received by said first path-setting-receiving section.

4. The transmission network according to claim 2, wherein said first path-setting-receiving section of said transmission node receives, as said change in path setting, address information about an input port of said transmission node into which a low-order group signal contained in said transmission signal is to be input; and
said transmission-path-setting change section changes settings of an input port of said transmission node in accordance with said address information received by said first path-setting-receiving section.

5. The transmission network according to claim 1, wherein said first path-setting-receiving section of said transmission node receives, as said change in path setting, information indicating that an input port of said transmission node into which a low-order group signal contained in said transmission signal is to be input is changed to another, unoccupied input port; and
said transmission-path-setting change section retrieves another, unoccupied input port in accordance with said address information received by said first path-setting-receiving section and change settings such that said input port of said transmission node is changed to said retrieved, unoccupied input port.

6. The transmission network according to claim 2, wherein said first path-setting-receiving section of said transmission node receives, as said change in path setting, information indicating that an input port of said transmission node into which a low-order group signal contained in said transmission signal is to be input is changed to another, unoccupied input port; and said transmission-path-setting change section retrieves another, unoccupied input port in accordance with said address information received by said first path-setting-receiving section and change settings such that said input port of said transmission node is changed to said retrieved, unoccupied input port.

7. The transmission network according to claim 1, wherein said first path-setting-receiving section of said transmission node receives, as said change in path setting, address information about an output port of said transmission node to which a high-order group signal corresponding to said transmission signal is to be output; and wherein said transmission-path-setting change section changes settings of said output port of said transmission node, in accordance with said address information received by said first path-setting-receiving section.

8. The transmission network according to claim 1, wherein said first path-setting-receiving section of said transmission node receives, as said change in path setting, address information indicating that an output port of said transmission node is given address information agreeing with said address information about said output port to which a low-order group signal contained in said transmission signal is to be output; and said transmission-path-setting change section changes settings of said output port of said transmission node in accordance with said information received by said first path-setting-receiving section.

9. The transmission network according to claim 1, wherein said first path-setting-receiving section of said transmission node receives, as said change in path setting, information indicating that an output port of said transmission node to which a high-order group signal corresponding to said transmission signal is to be output is changed to another, unoccupied output port; and said transmission-path-setting change section retrieves another, unoccupied output port in accordance with said address information received by said first path-setting-receiving section and change settings such that said output port of said transmission node is changed to said retrieved, unoccupied output port.

10. The transmission network according to claim 1, wherein said second path-setting-receiving section of said receiving node receives, as said change in path setting, address information about an output port of said receiving node to which a low-order group signal contained in said transmission signal is to be output; and wherein said receiving-path-setting change section changes settings of said output port of said receiving node, in accordance with said address information received by said second path-setting-receiving section.

11. The transmission network according to claim 1, wherein said second path-setting-receiving section of said receiving node receives, as said change in path setting, information indicating that an output port of said receiving port to which a low-order group signal contained in said transmission signal is to be output is given address information agreeing with said address information about said output port of said receiving node to which a high-order group signal corresponding to said transmission signal is to be output; and wherein said receiving-path-setting change section changes settings of said output port of said receiving node, in accordance with said information received by said second path-setting-receiving section.

12. The transmission network according to claim 1, wherein said second path-setting-receiving section of said receiving node receives, as said change in path setting, information indicating that an output port of said receiving node to which a low-order group signal contained in said transmission signal is to be output is changed to another, unoccupied output port; and said receiving-path-setting change section retrieves another, unoccupied output port in accordance with said address information received by said second path-setting-receiving section and changes settings such that said output port of said receiving node is changed to said retrieved, unoccupied output port.

* * * * *